United States Patent
Chang et al.

(10) Patent No.: US 9,229,167 B2
(45) Date of Patent: Jan. 5, 2016

(54) WDM MULTIPLEXING/DE-MULTIPLEXING SYSTEM AND THE MANUFACTURING METHOD THEREOF

(71) Applicants: Yung-Cheng Chang, Hsinchu (TW); Ken Kuo, Hsinchu (TW); Emin Chou, Hsinchu (TW)

(72) Inventors: Yung-Cheng Chang, Hsinchu (TW); Ken Kuo, Hsinchu (TW); Emin Chou, Hsinchu (TW)

(73) Assignee: Source Photonics, Inc., Chatsworth, CA (US)

( * ) Notice: Subject to any disclaimer, the term of this patent is extended or adjusted under 35 U.S.C. 154(b) by 51 days.

(21) Appl. No.: 13/735,735

(22) Filed: Jan. 7, 2013

(65) Prior Publication Data

US 2014/0112618 A1    Apr. 24, 2014

(30) Foreign Application Priority Data

Oct. 22, 2012    (CN) .......................... 2012 1 0402718

(51) Int. Cl.
*G02B 6/28*    (2006.01)
*G02B 6/293*    (2006.01)
(Continued)

(52) U.S. Cl.
CPC ............ *G02B 6/2938* (2013.01); *G02B 6/4215* (2013.01); *G02B 27/123* (2013.01); *G02B 6/29367* (2013.01); *G02B 6/425* (2013.01); *Y10T 29/49004* (2015.01); *Y10T 29/49769* (2015.01)

(58) Field of Classification Search
CPC .......................... G02B 6/2938; G02B 6/29367
USPC .......................................................... 385/24
See application file for complete search history.

(56) References Cited

U.S. PATENT DOCUMENTS 5,786,915 A    7/1998    Scobey
6,201,908 B1 *    3/2001    Grann .............................. 385/24
(Continued)

FOREIGN PATENT DOCUMENTS

CN    1278131 A    12/2000
CN    1359475 A    7/2002
(Continued)

OTHER PUBLICATIONS

Hyong-Seung Sung, Ryang-Gyu Lee and Hyon-Suh Kim; "Wavelength-Division Multiplex Arrangement Equied With Array Wave-Guide Grating for Alignment of Waveguide, and Alignment Arrangement Therefor"; Dec. 27, 2000; Bibliographic Data of CN1278131 (A); 2 pgs.; www.Espacenet.com.
(Continued)

*Primary Examiner* — Ryan Lepisto
*Assistant Examiner* — Erin Chiem
(74) *Attorney, Agent, or Firm* — Andrew D. Fortney; Central California IP Group, P.C.

(57) ABSTRACT

A WDM multiplexing/demultiplexing system includes a de-multiplexer configured to separate and guide light beams from an incident ray having a plurality of wavelengths to corresponding lenses on an optical device, a multiplexer configured to guide light beams from optical transmitters having various wavelengths through the corresponding lenses on the optical device and combine the light beams, a lens array including the corresponding lenses to receive and/or transmit the light beams from or to the de-multiplexer and multiplexer, and a light beam collimator configured to function with the multiplexer and de-multiplexer. The light beams received or transmitted by the light beam collimator and the light beams transmitted or received from or to the multiplexer and de-multiplexer are collinear. The light beam collimator and multiplexer/de-multiplexer can be easily positioned to predetermined or designed positions, thereby providing light beams output through the lenses in a plastic optical device. The WDM system advantageously reduces optical signal loss, while increasing the assembly yield.

20 Claims, 6 Drawing Sheets

(51) Int. Cl.
*G02B 27/12* (2006.01)
*G02B 6/42* (2006.01)

(56) References Cited

U.S. PATENT DOCUMENTS

| | | | |
|---|---|---|---|
| 6,272,349 B1* | 8/2001 | McGrath et al. | 455/456.3 |
| 6,396,978 B1* | 5/2002 | Grann | 385/24 |
| 6,456,757 B2 | 9/2002 | Kim et al. | |
| 6,526,199 B1 | 2/2003 | Song et al. | |
| 6,558,046 B2 | 5/2003 | Griffis et al. | |
| 6,572,278 B2 | 6/2003 | Hsieh et al. | |
| 6,582,252 B1* | 6/2003 | Lin | 439/607.46 |
| 6,652,161 B2 | 11/2003 | Grann et al. | |
| 6,945,711 B2* | 9/2005 | Chen et al. | 385/93 |
| 7,272,323 B2* | 9/2007 | Grann et al. | 398/139 |
| 7,532,826 B2* | 5/2009 | Zhu et al. | 398/212 |
| 2001/0026663 A1* | 10/2001 | Kim et al. | 385/76 |
| 2001/0043778 A1 | 11/2001 | Griffis et al. | |
| 2002/0018625 A1 | 2/2002 | Grann et al. | |
| 2002/0018635 A1* | 2/2002 | Hsieh et al. | 385/137 |
| 2004/0101247 A1* | 5/2004 | Chen et al. | 385/47 |
| 2005/0152640 A1* | 7/2005 | Lemoff | 385/24 |
| 2009/0003826 A1* | 1/2009 | Jeon et al. | 398/43 |
| 2009/0129783 A1* | 5/2009 | Ori et al. | 398/136 |
| 2009/0240139 A1* | 9/2009 | Yi | 600/425 |
| 2011/0033152 A1* | 2/2011 | Morris et al. | 385/24 |
| 2011/0058771 A1* | 3/2011 | Lee et al. | 385/33 |

FOREIGN PATENT DOCUMENTS

| | | |
|---|---|---|
| CN | 102486555 A | 6/2012 |
| CN | 202351467 U | 7/2012 |

OTHER PUBLICATIONS

Eric B. Gran; "Optical Wavelength Division Multiplexer/Demultiplexer Having Preformed Passively Aligned Optics"; Jul. 17, 2002; Bibliographic Data of CN1359475 (A); 2 pgs.; www.Espacenet.com.

Lin Yicun; "Optical Fiber Transmission System"; Jun. 6, 2012; Abstract of CN102486555 (A); www.Espacenet.com.

Wu Li, Ling Jiwu, Xu Yunbing, Mo Chuang, Yang Jianyang, Zhao Zhenyu and Zheng Rui; "Multipath Parallel Optical Coupler"; Jul. 25, 2012; Abstract of CN 202351467 (U); www.Espacenet.com.

* cited by examiner

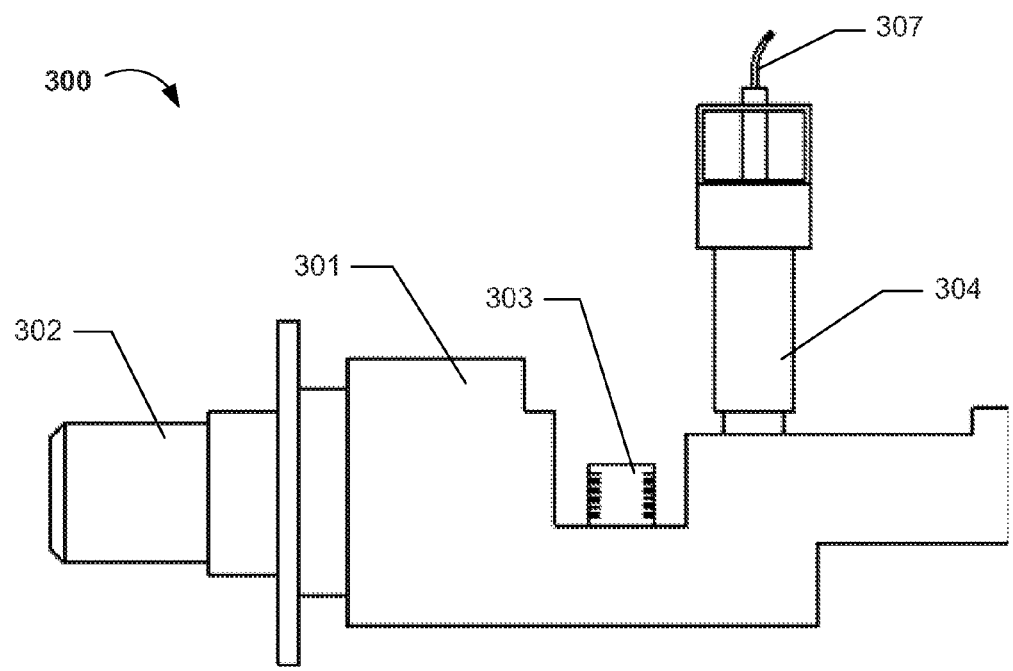
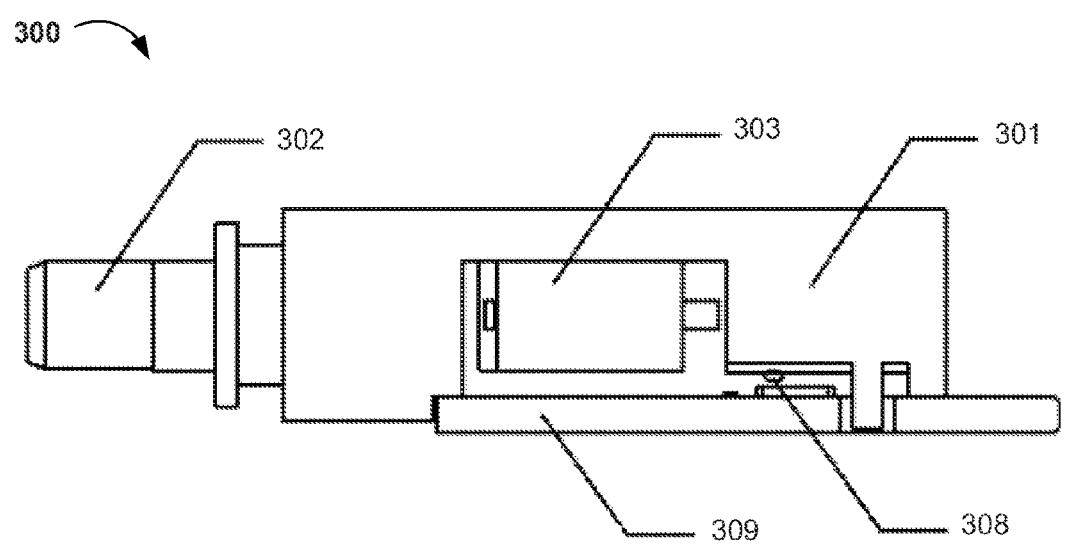

WDM MULTIPLEXING/DE-MULTIPLEXING SYSTEM AND THE MANUFACTURING METHOD THEREOF

CROSS REFERENCE TO RELATED APPLICATION

This application claims the benefit of Chinese Patent Application No. 201210402718.4, filed on Oct. 22, 2012, incorporated herein by reference as if fully set forth herein.

FIELD OF THE INVENTION

The present invention relates to a photoelectric conversion component in fiber optic data communications and telecommunications. In particular, embodiments of the present invention pertain to a wavelength division multiplexing (WDM; e.g., a coarse wavelength division multiplexing [CWDM]/de-multiplexing system and a manufacturing method thereof.

DISCUSSION OF THE BACKGROUND

Coarse wavelength division multiplexing (CWDM) is a technology that multiplexes multiple optical signals on a single optical fiber strand by using different wavelengths of laser light to carry different signals. There are two conventional CWDM systems. One conventional CWDM system is formed by single wavelength optical communication modules using an external multiplexer/demultiplexer (MUX/DEMUX). The other conventional CWDM system realizes zig-zag optical path actions of the MUX/DEMUX using injection molded plastic optical devices and thin film filters. Such conventional techniques provide low cost and low power consumption. However, there are some issues with these conventional techniques.

FIG. 1 is a diagram showing a conventional MUX/DEMUX system 100 having a "zigzag" optical path. In MUX/DEMUX systems 100 having the zigzag optical path, light from an optical source providing multiple wavelengths enters into an optical input port 102. Subsequently, the wavelengths are separated to each output port in optical module 101 by wavelength to realize de-multiplexing. Because the de-multiplexing process is reversible, four or more light beams having different wavelengths may be combined into one output light beam in the multiplexing process.

FIG. 2 is a diagram showing a conventional MUX/DEMUX component 200. FIG. 3 is a diagram showing the internal optical path 215 of the component 200 of FIG. 2. Generally, the optical module 201 implements multiplexing/de-multiplexing using the zigzag optical path 215. The conventional MUX/DEMUX system 200 may realize a smaller size, lower cost, and easier insertion and/or extraction of the optical fiber in comparison with system 100 of FIG. 1.

FIG. 4 shows a layout of a printed circuit board (PCB) 209 having an electrical circuit 211 adapted for relatively long conventional plastic optical devices. Typically, relatively long electrical circuits negatively affect the transmission performance of high speed digital signals.

One issue with the conventional MUX/DEMUX system(s) shown in FIGS. 2 and 3 is that a lens array having an arrangement parallel with incident light can affect the transmission performance of high speed digital electrical signals at the back-end of a fiber-optic communication device. Also, during assembly of a plastic optical communication device, the accumulated tolerances of positioning of various devices such as the collimator and the MUX/DEMUX system can prevent collimated light beams from the collimator being aligned properly with lenses in the plastic optical device. As a result, conventional MUX/DEMUX systems may have a relatively low yield.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

Embodiments of the present invention are intended to provide a WDM (e.g., CWDM) multiplexing/de-multiplexing system and a manufacturing method thereof to overcome one or more of the issues with conventional MUX/DEMUX systems.

The present invention provides a WDM (e.g., CWDM) multiplexing/de-multiplexing system, comprising (i) a de-multiplexer configured to separate and guide first light beams from an incident ray having a plurality of wavelengths to corresponding lenses on an optical device, (ii) a multiplexer configured to combine and guide second light beams from a plurality of optical transmitters, each such second light beam having a unique wavelength that passes through a corresponding lens on the optical device, wherein the multiplexer and the de-multiplexer together form a bi-directional optical subassembly (BOSA), (iii) an array of the corresponding lenses, to receive the first light beams from the demultiplexer and transmit the second light beams to the multiplexer, and (iv) a light-beam collimator configured to function or work with the multiplexer and de-multiplexer.

In various embodiments of the present invention, a light beam received or transmitted by the light-beam collimator and a light beam from or to the multiplexer/de-multiplexer are collinear. In one such embodiment, a transimpedance amplifier (TIA) array on a printed circuit board (PCB) can have the shortest wiring length to connect with the electrical connector on the PCB. Preferably, the lens array orientation is perpendicular to the light beam transmitted from or received by the light-beam collimator.

Preferably, the multiplexer/de-multiplexer and the light-beam collimator are on or in the same plastic optical device, which has a molded lens array thereon. In an exemplary embodiment, the lens array is integrated into the plastic optical device. Preferably, the plastic optical device is molded by injection molding.

In various embodiments, the lens array comprises at least two lenses. In an exemplary embodiment of the present invention, the lens array comprises four lenses. Preferably, the lenses are equally spaced at fixed intervals (for example, 750 microns, but not limited to 750 microns). The interval between the lenses may be based on the number of lenses and the actual demand.

In further embodiments, the lens array is accompanied by alignment holes in accordance with an applicable fiber patchcord (e.g., an optical fiber ribbon and/or cable) specification. Corresponding fiber patchcords have alignment pins corresponding to the alignment holes. In an exemplary embodiment, the fiber patchcord is a mechanical transfer (MT) fiber patchcord. However, any multiple fiber patchcord using alignment pins and alignment holes for passive alignment is within the spirit of this invention.

The present invention further provides a method of manufacturing the WDM (e.g., CWDM) multiplexing/de-multiplexing system, comprising: (i) matching the alignment pins on a fiber patchcord (e.g., an optical fiber ribbon or cable) with the alignment holes in a plastic optical device, and using the fiber patchcord to connect the lens array in the plastic optical device with one or more optical power meters (in one example, the number of fibers in the patchcord corresponds to the number of lenses in the lens array); (ii) positioning a multiplexer/de-multiplexer and a light-beam collimator in the plastic optical device; (iii) changing relative positions of the light-beam collimator and the multiplexer/de-multiplexer until each optical power meter detects a standard or predetermined optical output power level. Subsequently, fixing the light-beam collimator and the multiplexer/de-multiplexer on the plastic optical device with UV adhesive to assemble (e.g., finish the assembly process of) the plastic optical device, the light-beam collimator, and the multiplexer/de-multiplexer.

The present invention further concerns an optical receiving device, comprising the WDM and/or CWDM multiplexing/de-multiplexing system, an optical receiving portion, and an electrical circuit. The optical receiving portion is configured to function or work with the lens array in the WDM and/or CWDM multiplexing/de-multiplexing system. The optical receiving portion comprises an optical detector array.

Furthermore, the present invention relates to an optical transmitting device, comprising the WDM and/or CWDM multiplexing/de-multiplexing system, an optical transmitting portion and an electrical circuit, wherein a light beam that is emitted from the optical transmitting portion is captured by the lens array of the WDM and/or CWDM multiplexing/de-multiplexing system.

The present invention further relates to an optical transmitting-receiving device, comprising the WDM and/or CWDM multiplexing/de-multiplexing system, an optical receiving portion, an optical transmitting portion, and an electrical circuit. The optical transmitting-receiving device comprises the present WDM and/or CWDM multiplexing/de-multiplexing system, wherein a light beam that is emitted from the optical transmitting portion is captured by a part of the lens array, and the light beam that is emitted from the other part of the lens array is received by the optical receiving portion. Preferably, the optical transmitting portion comprises a surface emitting laser array or an edge-emitting laser array, and the optical receiving portion comprises an optical detector array.

Conventional plastic optical devices do not have an alignment hole system. As a result, the accumulated tolerance generated by positioning various devices can cause the collimated beam to not pass through the corresponding lens of the lens array in the plastic optical device during the assembly of the plastic optical device, the collimator, and the MUX/DEMUX. Consequently, the conventional design may have a relatively low yield.

In the present invention, the plastic optical device has precise alignment holes in locations (e.g., sides) where the lens array is positioned. Thus, active optical power monitoring is provided by connecting the MT fiber patchcord to the optical power meters. In other words, the present invention advantageously enables positioning the light-beam collimator and the multiplexer/de-multiplexer to fit predetermined or designed positions. From a technical point of view, manufacturing lenses and alignment holes with precise positions and sizes is relatively mature technology and can be applied in this invention.

Relative to existing technologies, the present invention advantageously:

(i) enables the optical design to reduce the length of the electrical transmission path of high speed digital signals on the PCB;

(ii) provides an easier manufacturing process with the introduction of the alignment holes on the plastic optical device and an MT fiber patchcord;

(iii) reduces the optical power loss of the optical signal caused by misalignment during assembly and increases the yield by introducing precise alignment holes accompanying the plastic lens array; and (iv) provides active optical power monitoring by connecting the MT fiber patchcord to the corresponding optical power meter, thereby positioning the light-beam collimator and the multiplexer/de-multiplexer to fit predetermined or designed positions in the present plastic optical device.

Thus, the present invention provides a molded plastic optical device with a unique assembly procedure for a receiver (e.g., a 40 G/100 G receiver) optical subassembly. In the present molded plastic optical device, a mechanical transfer (MT) based guiding structure functions as the detector array during the assembly process. With the help of the MT fiber patchcord, the light-beam collimator and the DEMUX can be aligned to a predetermined or designed position through the active alignment method. This is a benefit from designing the MT-based guide or alignment holes in the plastic optical device. Thus, a passive alignment method through the alignment mechanism can be applied, and the MT-based patchcord may simulate the optical detector array for the active alignment of the zigzag type DEMUX and the light-beam collimator.

These and other advantages of the present invention will become readily apparent from the detailed description of various embodiments below.

BRIEF DESCRIPTION OF THE DRAWINGS

FIG. 8 is a side view showing the setup between the MT-based fiber patchcord and a plastic optical device in accordance with the present invention.

FIG. 9 is a diagram showing the assembly of the plastic optical device aligned with a PCB in accordance with the present invention.

DETAILED DESCRIPTION

Figure 1:
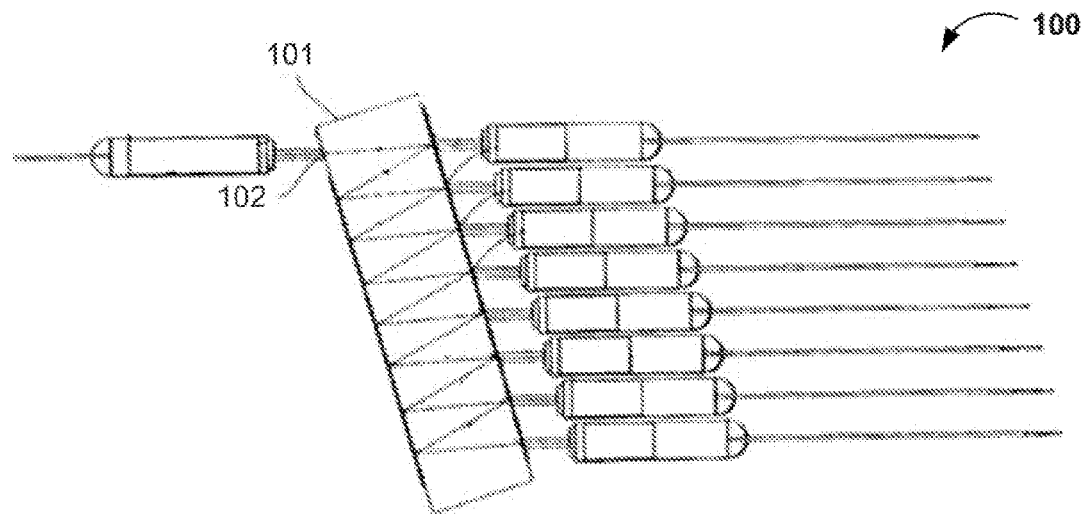
FIG. 1 is a diagram showing a conventional multiplexer/de-multiplexer (MUX/DEMUX) system.
Figure 2:
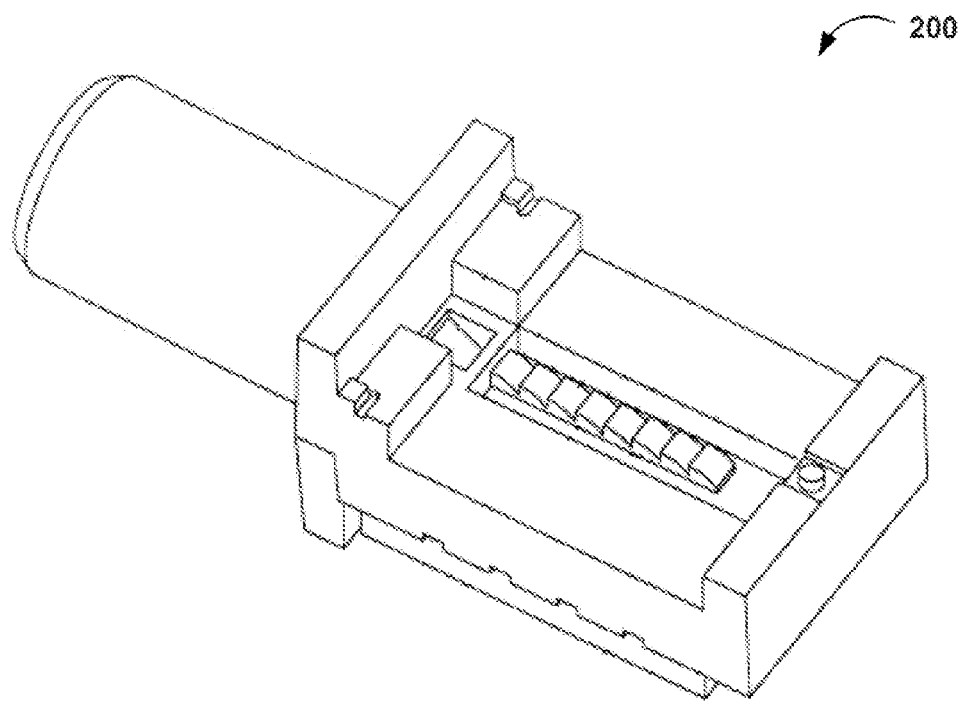
FIG. 2 is a diagram showing a conventional plastic molded MUX/DEMUX system.
Figure 3:
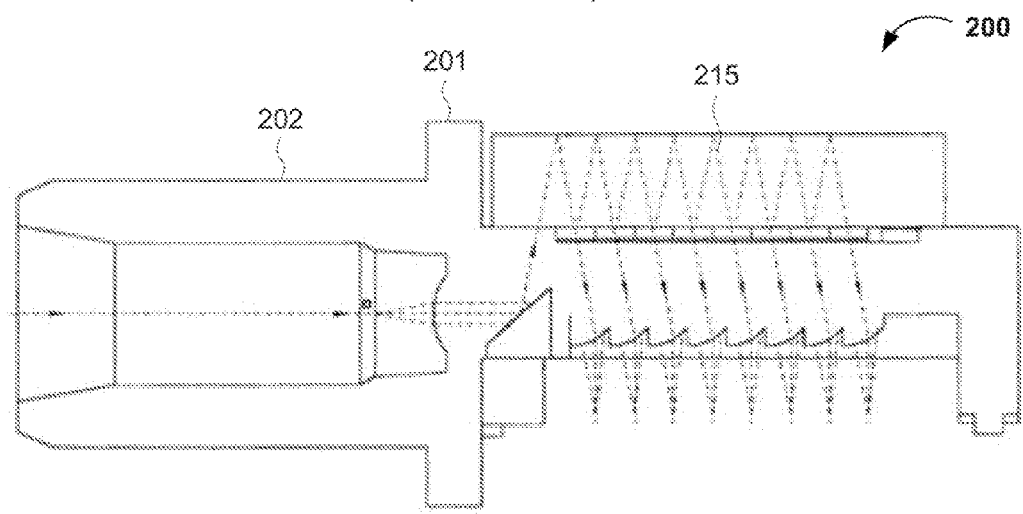
FIG. 3 is a diagram showing an internal optical path of the MUX/DEMUX in FIG. 2.

Reference will now be made in detail to various embodiments of the invention, examples of which are illustrated in the accompanying drawing(s). In order to achieve the objectives, technical solutions and advantages of the present invention more clearly, further details of the invention are described below with regard to the Figure(s). While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention. The embodiments described here are only used to explain, rather than limit, the invention.

The technical proposal(s) of embodiments of the present invention will be fully and clearly described in conjunction with the drawing. In the following embodiments, it will be understood that the descriptions are not intended to limit the invention to these embodiments. Based on the described embodiments of the present invention, other embodiments can be obtained by one skilled in the art without creative contribution, and are in the scope of legal protection given to the present invention.

Furthermore, all characteristics, measures or processes disclosed in this document, except characteristics and/or processes that are mutually exclusive, can be combined in any manner and in any combination possible. Any characteristic disclosed in the present specification, claims, Abstract and Figures can be replaced by other equivalent characteristics or characteristics with similar objectives, purposes and/or functions, unless specified otherwise. Each characteristic is generally only an embodiment of the invention disclosed herein.

As shown in FIGS. 5-10, the present WDM (e.g., CWDM system) 300 comprises a plastic optical device 301, a collimator 302 connected to the front end of the plastic optical device 301, a MUX/DEMUX 303 mounted on the plastic optical device 301, and a lens array 308 configured to receive light from the MUX/DEMUX 303 and/or transmit light to the MUX/DEMUX 303. Light received or transmitted by the collimator 302 and light from or to the MUX/DEMUX 303 are collinear.

Figure 6:
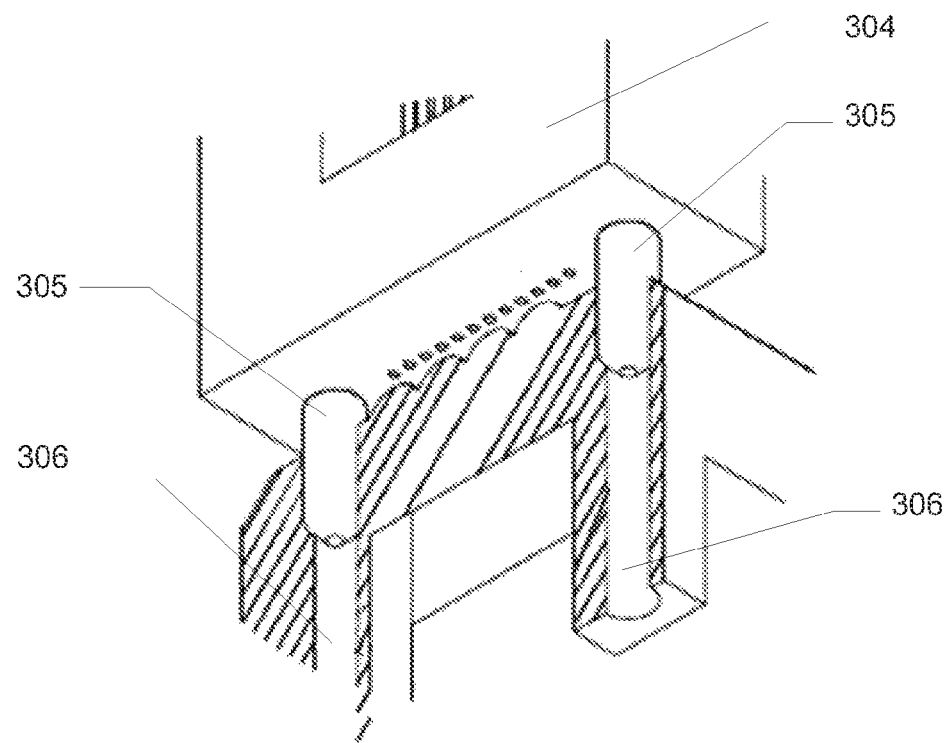
FIG. 6 is a perspective view showing alignment holes in an example of the present plastic optical device, aligned with the alignment pins on a mechanical transfer (MT) fiber patchcord.
Figure 7:
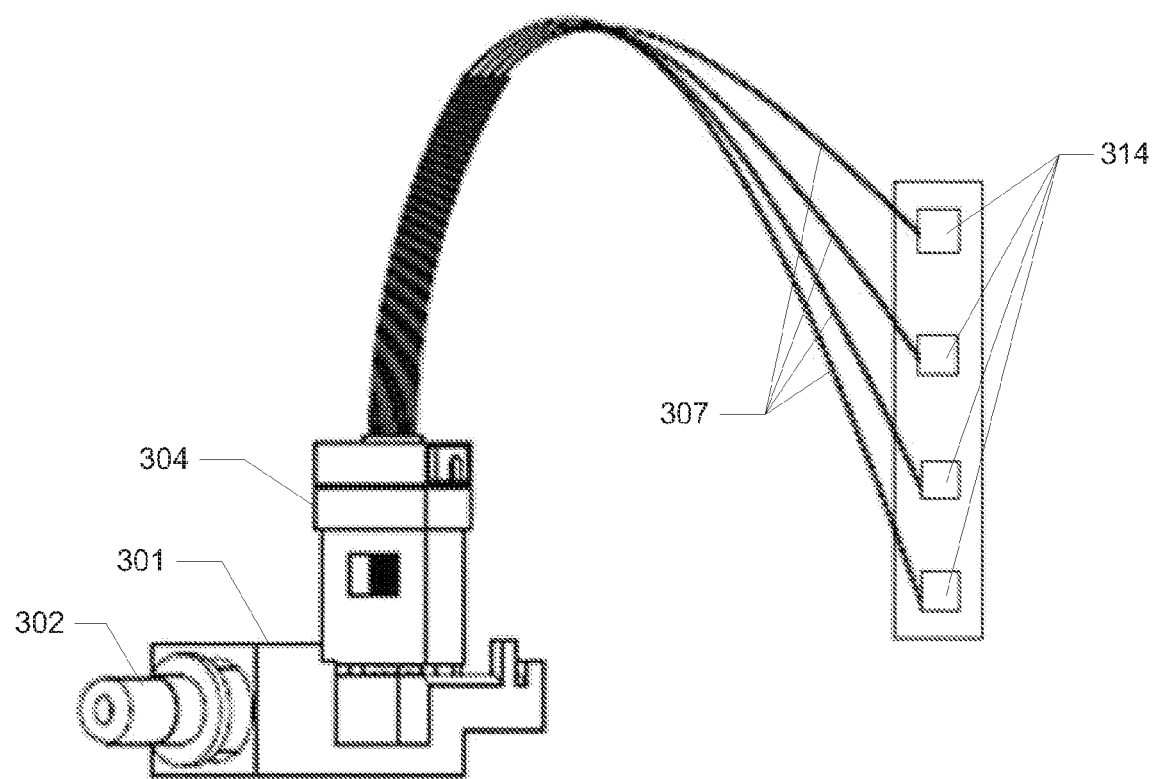
FIG. 7 is a drawing showing the setup and/or use of a MT-based fiber patchcord to simulate the optical detector array and then measure the optical power level of each DEMUXed wavelength by each individual power meter through the MT-based fiber patchcord.

Referring to FIGS. 6-7, the present WDM system and assembly process may further comprise a mechanical transfer (MT) fiber patchcord or cable 304 having two alignment pins 305, optical power meters 314 (FIG. 7) connected to the MT fiber patchcord 304 via an optical fiber 307, and two alignment holes 306 on the surface of the plastic optical device 301. With alignment pins 305 aligned and/or matching with the alignment holes 306, the MT fiber patchcord 304 is utilized to simulate the optical detector array as an intermediate process during the assembly among the collimator, the plastic optical device, and the MUX/DEMUX.

Figure 10:
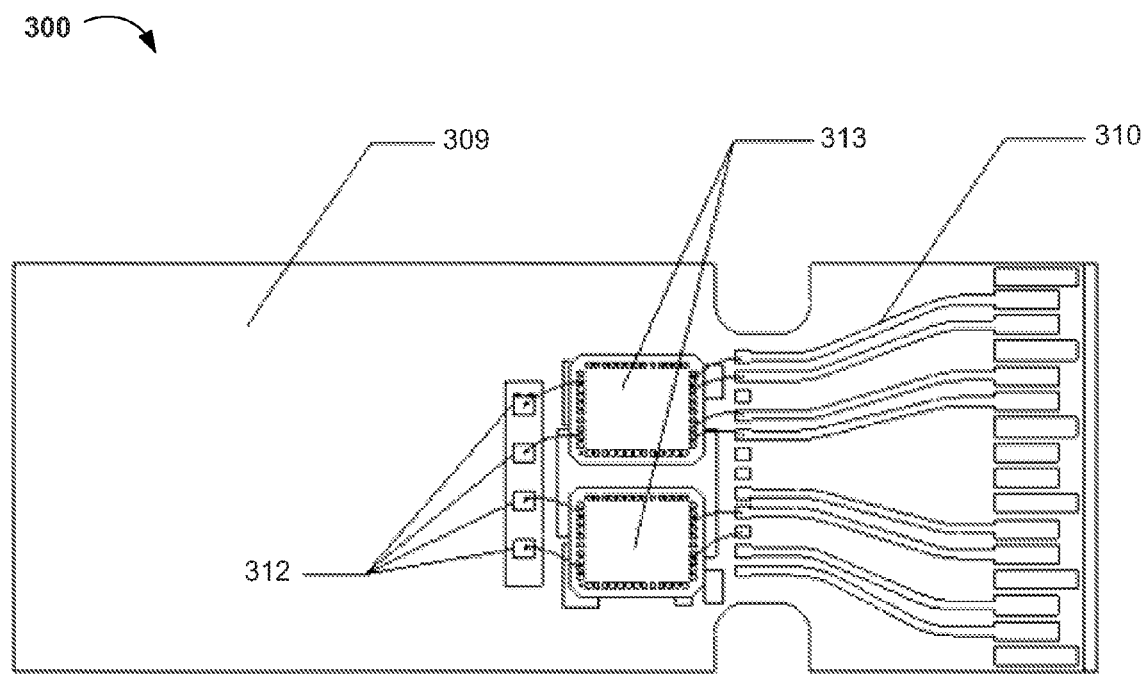
FIG. 10 is an exemplary layout showing a PCB electrical circuit (including traces) adapted for the present plastic optical device.

Referring to FIGS. 8-9, injection molded plastic optical device 301 functions as a base, holder, or frame for the MUX/DEMUX 303 and the collimator 302. Light having various wavelengths transmitted from the DEMUX 303 can be guided to corresponding lenses in the lens array 308 in or on the plastic optical device 301, as shown in FIG. 9. The lens array 308 comprises lenses that are spaced apart by, e.g., 750 microns. As a result, the lens array 308 is compatible with the four optical detectors 312, followed by the transimpedance amplifier (TIA) array 313, at the back end of the plastic optical device 301, as shown in FIG. 10. In such a configuration, the orientation of the optical detector array 312, the transimpedance amplifier (TIA) array 313, and the electrical metal lines are substantially parallel at the back end of the optical device 301. This arrangement allows the output from the TIA array 313, which are behind the optical detector array 312, to be transmitted to an electrical cable (e.g., connected to a host device) on the PCB 309 at the back end via relatively short electrical metal lines or traces 310.

Figure 4:
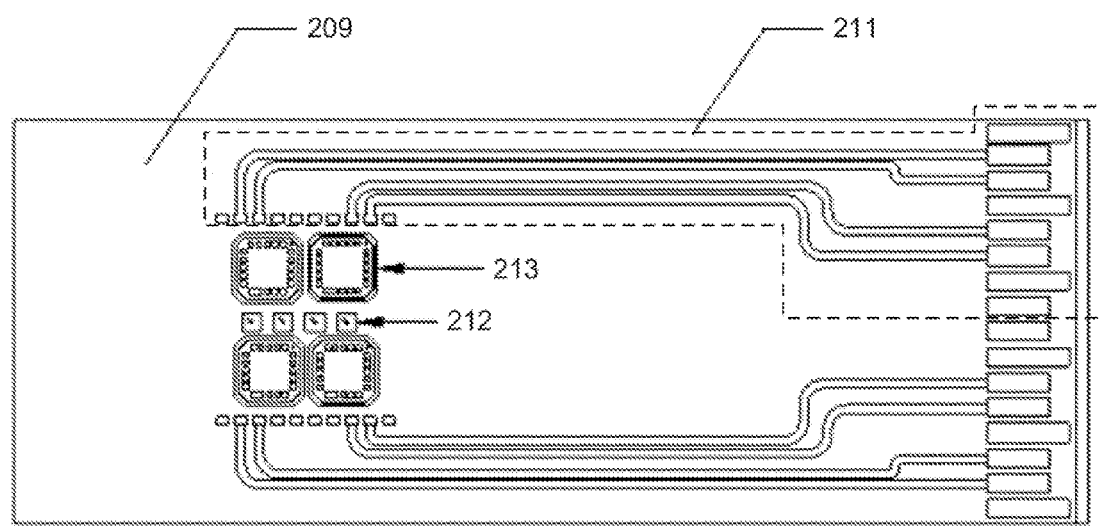
FIG. 4 shows a layout of a printed circuit board (PCB) having an electrical circuit (including traces) adapted for a conventional optical detector arrangement.
Figure 5:
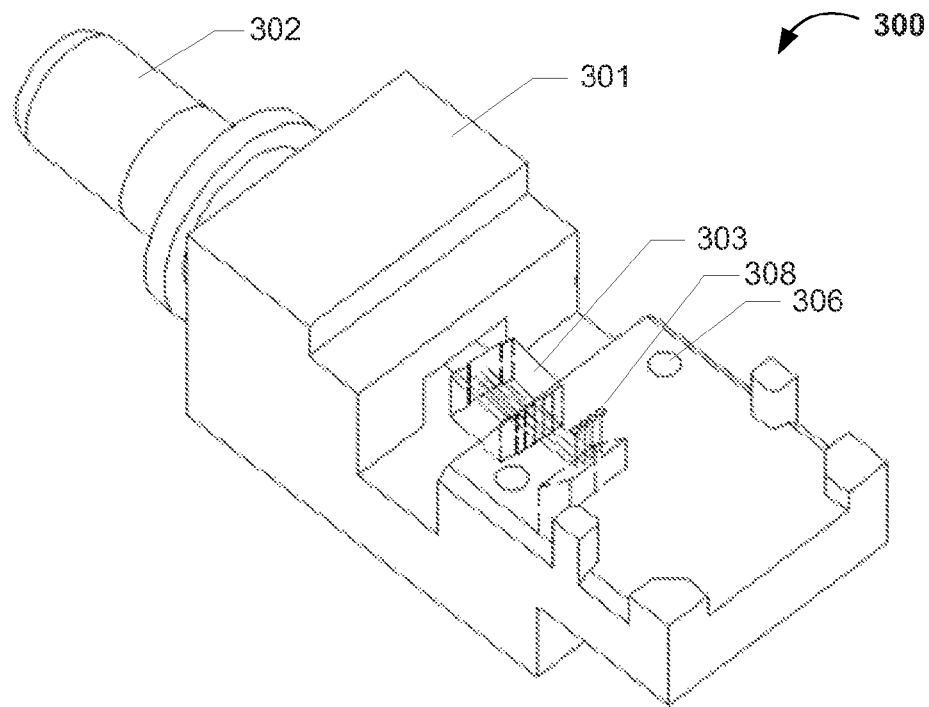
FIG. 5 is a diagram showing connections among various components, such as the optical device, a light-beam collimator, and a MUX/DEMUX.

Referring back to FIG. 4, which is an exemplary layout showing a PCB 209 having an electrical circuit arrangement 211 adapted for conventional plastic optical devices, the metal lines or traces in this electrical circuit arrangement 211 are relatively long. As previously discussed, long electrical metal lines or traces negatively affect the transmission performance of high speed digital signals. Distortion due to long transmission traces (such as in the layout in FIG. 4) when using optical detector array 212 accompanying with the TIA array 213 to convert optical signals into high speed digital electrical signals may be reduced by implementing the layout and/or circuitry shown in FIG. 10.

Referring back to FIGS. 5-6, two alignment holes 306 that are compatible or mated with the alignment pins 305 on the MT fiber patchcord or cable 304 are applied to and/or formed in the plastic optical device 301. By positioning the two alignment pins 305 on the MT fiber patchcord 304 into the two alignment holes 306 on the plastic optical device 301, a MT fiber ribbon formed from four single-mode or multi-mode fibers 307 may be connected to four individual optical power meters 314, as shown in FIG. 7. The fiber 307 is connected with the optical power meter 314 to monitor the optical power level during the assembly process. The fibers 307 in the MT fiber patchcord 304 can passively align with the lens array 308 on the plastic optical device 301 to receive light from the MUX/DEMUX 303 with the greatest coupling efficiency through the active alignment method.

In addition, in the WDM and/or CWDM system, the relative positions of the collimator 302 and the MUX/DEMUX 303 may be changed or adjusted until each optical power meter 314 detects a predetermined, specified and/or standardized optical output power level. Furthermore, to complete the assembly of the WDM and/or CWDM system, the collimator 302 and MUX/DEMUX 303 may be fixed to the plastic optical device 301 with a UV adhesive. First, the light-beam collimator 302 and the MUX/DEMUX 303 are mounted in adjustable locations on the device 301, then the optimal locations are determined using the optical power meter(s), and the locations of 302 and 303 are secured using UV adhesive when the optimal locations are determined.

If there are no alignment holes in the WDM and/or CWDM system in the plastic optical device 301, the accumulated tolerances of positioning various devices in the WDM and/or CWDM system may prevent collimated light beams from the collimator 302 from properly passing through the lenses in plastic optical device 301 during the assembly of the plastic optical device 301, the collimator 302, and the MUX/DEMUX 303. Thus, conventional WDM and/or CWDM systems may result in relatively low yields. In the WDM and/or CWDM system of the present invention, positioning the pins 305 on the MT fiber patchcord to align or match up with the alignment holes 306 in the plastic optical device 301 provides adequate alignment of the collimator 302 and the MUX/DEMUX 303 in predetermined or designed positions. As a result, collimated light from the collimator 302 can be guided to the lens array 308 on the plastic optical device 301, which advantageously reduces the energy loss of the optical signal, thus increasing the yield.

The introduction of the alignment holes 306 on the plastic optical device 301 can simplify the alignment process of the collimator 302 and the MUX/DEMUX 303 through active alignment skill. Similarly, it can be used in manufacturing process of a transmitter optical subassembly (TOSA) and a bi-directional optical subassembly (BOSA). The optical receiving portion is the optical detector array 312, and the optical transmitting portion is a surface emitting laser array or edge-emitting laser array (not shown).

The present WDM and/or CWDM multiplexing/de-multiplexing system employs the MT fiber patchcord 304 with optical power meters 314 to align the collimator 302, the WDM and/or CWDM MUX/DEMUX 303 to the predetermined or designed positions on the optical device 301. Various embodiments of WDM and/or CWDM systems with alignment pins aligning to the alignment holes via precise molds and corresponding devices may be used and are within the scope of the present invention.

CONCLUSION/SUMMARY

Thus, the present invention provides a WDM multiplexing/de-multiplexing system (e.g., a CWDM multiplexing/de-multiplexing, system), and manufacturing method thereof. The WDM and/or CWDM multiplexing/de-multiplexing system comprises (i) a de-multiplexer configured to separate and guide light beams from an incident ray having a plurality of wavelengths to corresponding lenses on the optical device, (ii) a multiplexer configured to combine and guide light beams from a plurality of optical transmitters, the light beams having a plurality of wavelengths and passing through the corresponding lenses on the optical device, wherein the multiplexer and the de-multiplexer together form a bi-directional optical subassembly (BOSA), (iii) a lens array comprising the corresponding lenses to receive the light beams from and transmit the light beams to the de-multiplexer and multiplexer, and (iv) a light-beam collimator configured to function or work with the multiplexer and de-multiplexer. A light beam received or transmitted by the light-beam collimator and a light beam from or to the multiplexer/de-multiplexer are collinear. The light-beam collimator and the multiplexer/de-multiplexer can be easily positioned to the predetermined or designed positions through the introduction of alignment holes in the plastic optical device, a MT-based patchcord with optical power meters, and active alignment skill. With the alignment holes in the plastic optical device, a patchcord with alignment pins can match up with the alignment holes to simulate the optical detector array in situ. As a result, the present WDM and/or CWDM system advantageously reduces optical signal loss and increases the assembly yield.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A WDM multiplexing/de-multiplexing system, comprising:
   a de-multiplexer configured to separate and guide first light beams from an incident ray having a plurality of wavelengths to corresponding lenses on an optical device;
   a multiplexer configured to combine and guide second light beams from a plurality of optical transmitters, the second light beams having a plurality of wavelengths and passing through said corresponding lenses on said optical device, wherein said multiplexer and said de-multiplexer together form a bi-directional optical subassembly (BOSA);
   a lens array comprising said corresponding lenses to receive said first light beams from said de-multiplexer and transmit said second light beams to said multiplexer, wherein said lens array comprises four lenses in a row, oriented along a direction that is parallel with a back end of the optical device and perpendicular to said first and second light beams;
   alignment holes accompanying or adjacent to said lens array;
   a light-beam collimator configured to receive the second light beams directly from said multiplexer and provide the first light beams directly to said de-multiplexer, wherein the second light beams received by the light-beam collimator are collinear with the first light beams provided by the light-beam collimator; and
   a printed circuit board having a plurality of optical detectors oriented along the direction that is parallel with the back end of the optical device, a plurality of transimpedance amplifiers oriented along a direction that is parallel with the plurality of optical detectors, and a plurality of electrical metal lines or traces thereon, the optical detectors receiving the first light beams from the lens array, the electrical metal lines or traces transmitting an output from the transimpedance amplifiers to an interface for an electrical cable or to a host device, wherein the transimpedance amplifiers are physically located between the optical detectors and the interface.

2. The system of claim 1, wherein said optical device comprises a plastic optical device having said lens array, said multiplexer/de-multiplexer, and said light-beam collimator thereon.

3. The system of claim 2, wherein said lens array is integrated into said plastic optical device.

4. The system of claim 3, wherein said lenses are spaced apart by equal intervals.

5. The system of claim 2, wherein said plastic optical device comprises an injection molded optical device.

6. The system of claim 2, wherein said alignment holes are between said lens array and a peripheral edge of said plastic optical device that is perpendicular to the back end of the plastic optical device.

7. The system of claim 6, further comprising a fiber patchcord or a cable having alignment pins corresponding to said alignment holes.

8. The system of claim 7, wherein said fiber patchcord or said cable comprises a mechanical transfer (MT) fiber patchcord or said cable.

9. The system of claim 7, wherein said fiber patchcord or said cable comprises multiple fibers with alignment pins.

10. A method of manufacturing the WDM multiplexing/de-multiplexing system of claim 1, comprising:
matching alignment pins on a multiple fiber optical patchcord with said alignment holes in a plastic optical device comprising the lens array, and using each fiber in the multiple fiber patchcord to connect each lens of the lens array in said plastic optical device with a corresponding optical power meter;
positioning the multiplexer/de-multiplexer and the light-beam collimator in said plastic optical device; and
changing relative positions of said light-beam collimator and said multiplexer/de-multiplexer until each optical power meter detects a standard, specified or predetermined optical output power level.

11. The method of claim 10, further comprising fixing said light-beam collimator and said multiplexer/de-multiplexer to said plastic optical device with UV adhesive.

12. The method of claim 10, wherein the WDM multiplexing/de-multiplexing system further comprises an optical receiving device to function or work with said lens array, wherein said optical receiving device comprises (i) the plurality of optical detectors, configured to receive said first light beams from said lens array and (ii) a first electrical circuit comprising the plurality of transimpedance amplifiers to function or work with said optical receiving portion.

13. The method of claim 12, wherein said optical receiving portion comprises an optical detector array.

14. The method of claim 10, wherein the WDM multiplexing/de-multiplexing system further comprises an optical transmitting device to function or work with said lens array, wherein said optical transmitting device comprises (i) the plurality of optical transmitters, configured to emit said second light beams through said lens array and (ii) a second electrical circuit to function or work with said optical transmitters.

15. The method of claim 14, wherein the optical transmitting portion comprises a surface emitting laser array or an edge-emitting laser array.

16. The method of claim 10, wherein the WDM multiplexing/de-multiplexing system further comprises the plurality of optical transmitters and the plurality of optical detectors, the optical transmitters being configured to emit said second light beams through said lens array, and the plurality of optical detectors being configured to receive said first light beams through said lens array.

17. The method of claim 16, wherein said optical receiving portion comprises an optical detector array, and said optical transmitting portion comprises a surface emitting laser array or an edge-emitting laser array.

18. The system of claim 1, wherein said electrical metal lines or traces are completely between the transimpedance amplifiers and the interface for the electrical cable or the host device.

19. An optical transmitting-receiving device, comprising the WDM multiplexing/de-multiplexing system of claim 1 and an optical transmitting portion, the optical transmitting portion comprising the plurality of optical transmitters.

20. The optical transmitting-receiving device of claim 19, wherein the plurality of optical transmitters comprises a surface emitting or edge-emitting laser array.

* * * * *